Dec. 27, 1938.   A. THOMAS   2,141,422
CONTROL DEVICE FOR VARIABLE CONDENSERS
Filed March 20, 1936   2 Sheets-Sheet 1

Inventor:
André Thomas

Dec. 27, 1938.   A. THOMAS   2,141,422
CONTROL DEVICE FOR VARIABLE CONDENSERS
Filed March 20, 1936   2 Sheets-Sheet 2
*Fig. 3*     *Fig. 5*
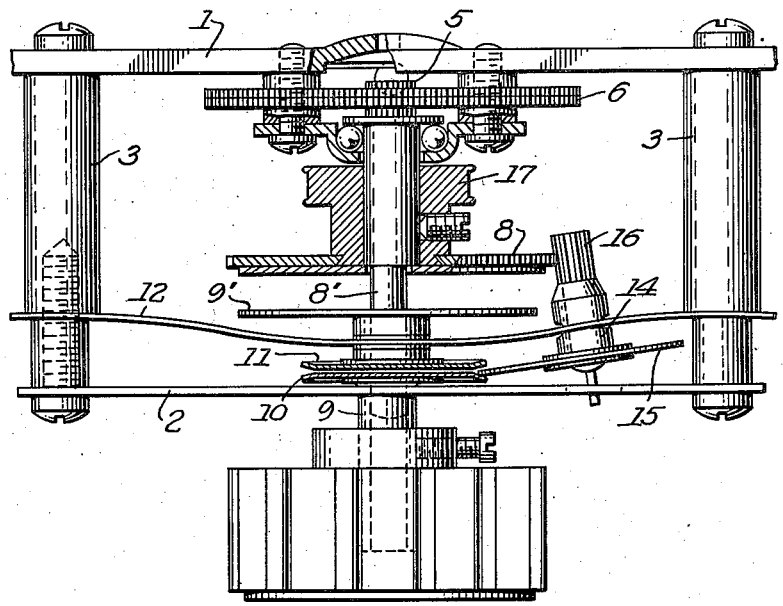
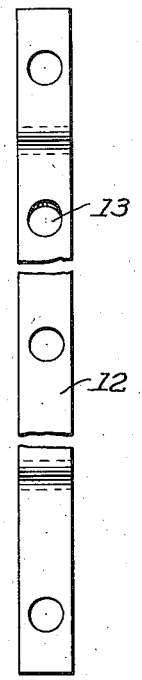
*Fig. 4*
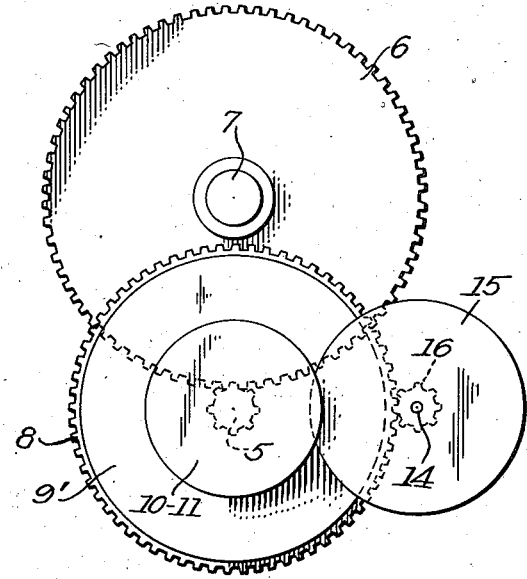
Inventor:
André Thomas Patented Dec. 27, 1938

2,141,422

UNITED STATES PATENT OFFICE 2,141,422

CONTROL DEVICE FOR VARIABLE CONDENSERS

André Thomas, Malakoff, France

Application March 20, 1936, Serial No. 69,759½
In Germany March 19, 1935

1 Claim. (Cl. 74—10)

Control devices to be adapted to certain apparatus requiring an exact adjustment, such as variable condensers, may comprise, with a view to the exact search for this point of adjustment, a control device which enables two speeds to be obtained: one permitting the rapid movement of the controlled member or members and consequently the approximate adjustment; the other, a reduction gear, permitting the optimum adjustment to be obtained, and this adjustment can be indicated in any suitable manner, for example, by means of a scale or a plate in front of which an index is moved, the movement of this index being the same as that of the controlled member or members.

The present invention has for its object to provide a device fulfilling the above conditions and applicable, in a general manner, to the control of all apparatus requiring to be adjusted in a very precise manner, such as variable condensers and inductances, and particularly to the control of variable condensers used for the reception of radio telegraphic signals transmitted by transmitters working on high frequencies.

The device provided by means of this invention is constructed in such a manner that it can occupy two positions corresponding respectively to the two driving speeds of the controlled member or members and can pass instantaneously from one of its positions to the other, and it comprises on the one hand means adapted to avoid, in the two positions, all backlash of the control and on the other hand, means interposed between the control member and the controlled apparatus, with a view to limiting the applied force and of avoiding all chance of breaking of the members.

The attached drawings will enable the characteristics of this invention to be well understood.

Figure 3 shows an embodiment of the device according to the invention intended to be applied to the control of a variable condenser of the form used in radio telegraphy.

Figure 4 is a face view of the driving members of the device shown in Figure 3.

Figure 5 is a view of the spring plate which can only occupy two stable positions and which constitutes the main feature of this invention.

Figure 1:
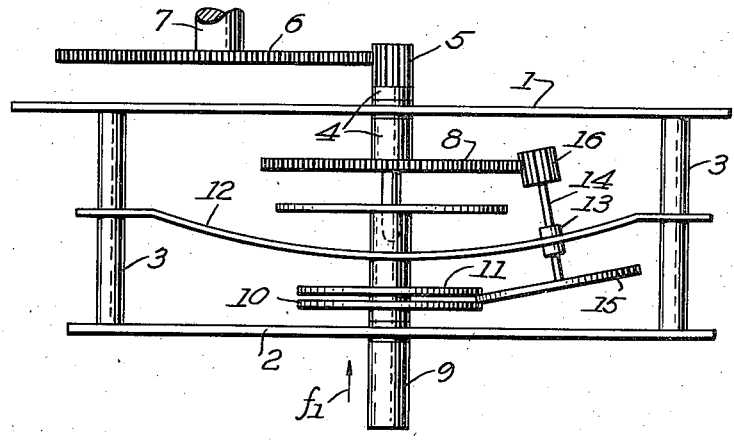
Figure 1 is a plan view of one embodiment of the device according to this invention, the members occupying the position corresponding to the maximum reduction (slow speed of displacement of the controlled member or members).
Figure 2:
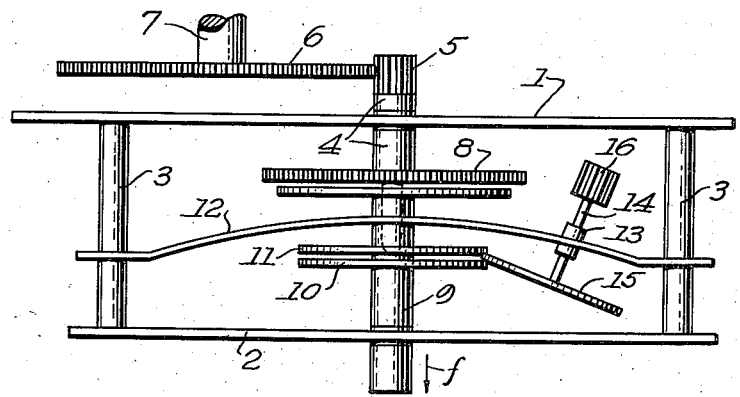
Figure 2 is a view similar to Figure 1 but with the members of the device in the position corresponding to the minimum reduction (fast speed of displacement of the controlled member or members).

Referring first of all to Figures 1 and 2:

The device according to this invention comprises an appropriate support formed of two cheeks 1 and 2 connected together by rods 3. On the cheek 1 of this support is mounted in a freely rotatable manner a shaft 4 provided with a toothed part 5 gearing with a toothed wheel 6 fixed to the shaft 7 which it is intended to drive. On the end opposite the toothed part 5, the shaft 4 is provided with a toothed disc 8 and an extension 8' of smaller cross-section; this extension serving to center a hollow shaft 9 passing through the cheek 2 of the support in which it can turn freely. This hollow shaft has attached to it on the one hand, a friction clutch disc 9' and, on the other hand, two friction discs 10 and 11. It passes through a spring 12 in which it can turn freely but the axial movements of which it is caused to follow. The free ends of the spring 12 are fixed on the rods 3 of the support and the form of this spring is such that its length is greater than the straight line distance between its points of attachment to the rods 3. Under these conditions, the said spring can only occupy two stable positions, those shown in Figures 1 and 2 of the drawings; these two positions being obtained by axial displacement of the shaft 9 with which it forms a unit.

The said spring 12 also carries a sleeve 13 in which is mounted so as to be freely rotatable a shaft 14 provided at one end with a disc 15 the edge of which is always engaged with the friction discs 10 and 11 mounted on the shaft 9. The other end of the shaft 14 is provided with a pinion 16 intended to co-operate with the toothed disc 9 in a manner hereinafter explained.

The operation of this device is as follows:

If, when the constituent members occupy for example the position shown in Figure 2, a pull is exerted on the shaft 9 in the direction of the arrow f, the spring 12 is caused to occupy the position shown in Figure 1. The plate 9' driven by the shaft 9 leaves the toothed disc 8 and the shaft 14 moves angularly to bring its pinion 16 into engagement with the toothed disc 8; the resiliency of the spring 12 avoiding backlash. If the shaft 9 is turned, its movement of rotation will be transmitted by the discs 10 and 11 to the disc 15 and by the shaft 14 and its pinion 16 to the toothed disc 8 which controls by its extremity 5 the toothed wheel 6 fixed to the shaft 7 of the member to be operated.

The position of maximum speed reduction is thus obtained.

It is to be noted that, when an abnormal resistance is encountered, a slip will take place between the discs 10 and 11 and the disc 15 which will avoid all chance of breaking of the members.

It will be readily understood that the device constituted by the friction discs 10 and 11 and the disc 15 is not intended to provide any reduction but to permit of relative displacement of the shaft 14 with respect to the shaft 9.

When the members of the device occupy the position shown in Figure 1, it is sufficient, in order to bring them into the position of small reduction or rapid control, to apply to the shaft 9 a push in the direction of the arrow $f^1$ Figure 1). This push brings the plate 9' into contact with the toothed disc 8 by deforming the spring 12 which then occupies the position shown in Figure 2.

It is to be noted that the engagement of the clutch (discs 8 and 9') may be increased by providing one or other of these discs with an appropriate material.

On the other hand, the shaft 14 carried by the spring 12 and following the movements of the same, frees the pinion 16 from the disc 8 and occupies the position shown in Figure 2. At the same time, the disc 9' engages with the toothed disc 8 and the shaft 9 directly controls the shaft 4. The discs 10, 11 and 15 always remain in engagement although they can slide over the face of one another, and the shaft 14 turns idly in its sleeve support 13. In the case of excessive force being applied, the clutch constituted by the toothed disc 8 and the disc 9' slips, thus avoiding all chance of breaking of the members.

Figures 3 and 4 show an embodiment applicable to a variable condenser used for example in radio telegraphy. In this case, the reduction apparatus is connected to the index either by a cable rolled on the drum 17 or by a needle fixed on the axle of this drum or in any other manner.

In this device, the same characteristics as those above described are found and consequently the same will not be described in detail.

I claim:

A control device for variable condensers comprising in combination: a frame formed by two cheeks connected by braces; a secondary shaft connected to the controlled member; a toothed clutch disc and a centering pin secured to the said secondary shaft; a primary shaft; a control member secured to the primary shaft; a second clutch disc secured to the said primary shaft and cooperating with the said toothed clutch disc; a recess provided in the primary shaft intended to receive the said centering pin; two friction discs secured to the said primary shaft; a leaf spring through which freely passes the primary shaft but following the axial movements of the latter; means for securing the free ends of the leaf spring to the braces of the frame, the form of this spring being such that its length is greater than the straight line distance between its points of attachment to the said braces; a rod freely passing through the said spring; a pinion secured to one end of the said rod the other end of which carries an intermediate disc engaged between the friction discs on the said primary shaft; the axial displacement of said primary shaft causing the leaf spring to occupy two stable positions, one corresponding to the direct control of the secondary shaft in which position the clutch discs are engaged and the pinion carried by the rod passing through the said spring is disengaged from the teeth of the toothed clutch disc; the other, in which the other clutch disc is declutched from the said toothed clutch disc and the said pinion is engaged with the teeth of the toothed clutch disc; the rotating movement of the said primary shaft being transmitted to the secondary shaft through the intermediary of the friction discs on the primary shaft, the intermediate disc engaged between the said friction discs, the pinion on the rod of the said intermediate disc, and the toothed clutch disc.

ANDRÉ THOMAS.